April 2, 1935.  W. M. SMITH  1,996,528
SAFETY DEVICE FOR AUTOMOBILES
Filed June 25, 1934   2 Sheets-Sheet 1
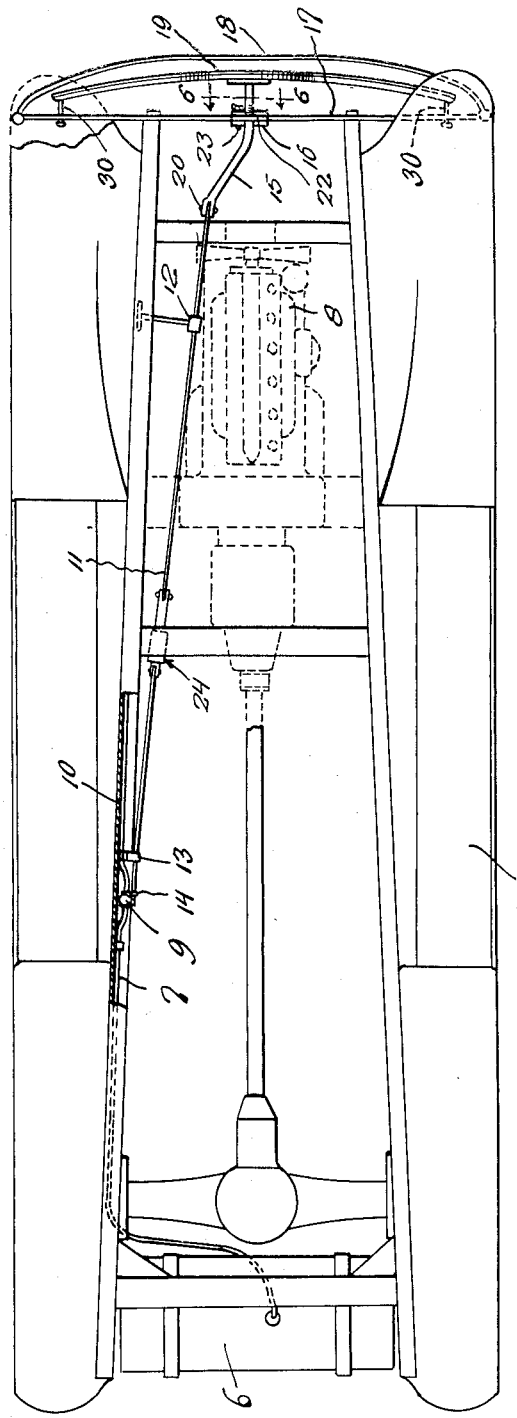
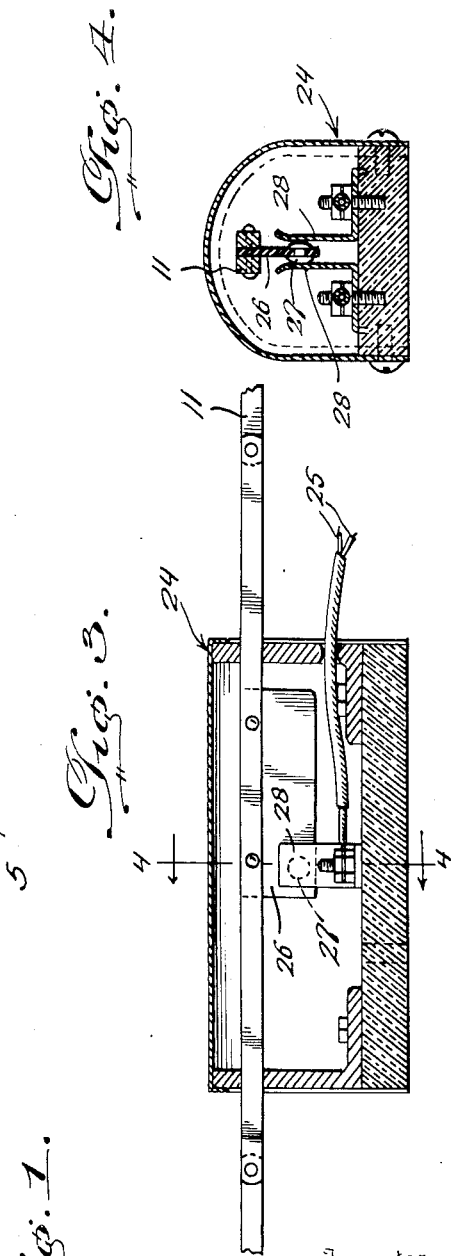
Inventor
Walter M. Smith,
By J. Stanley Burch
Attorney

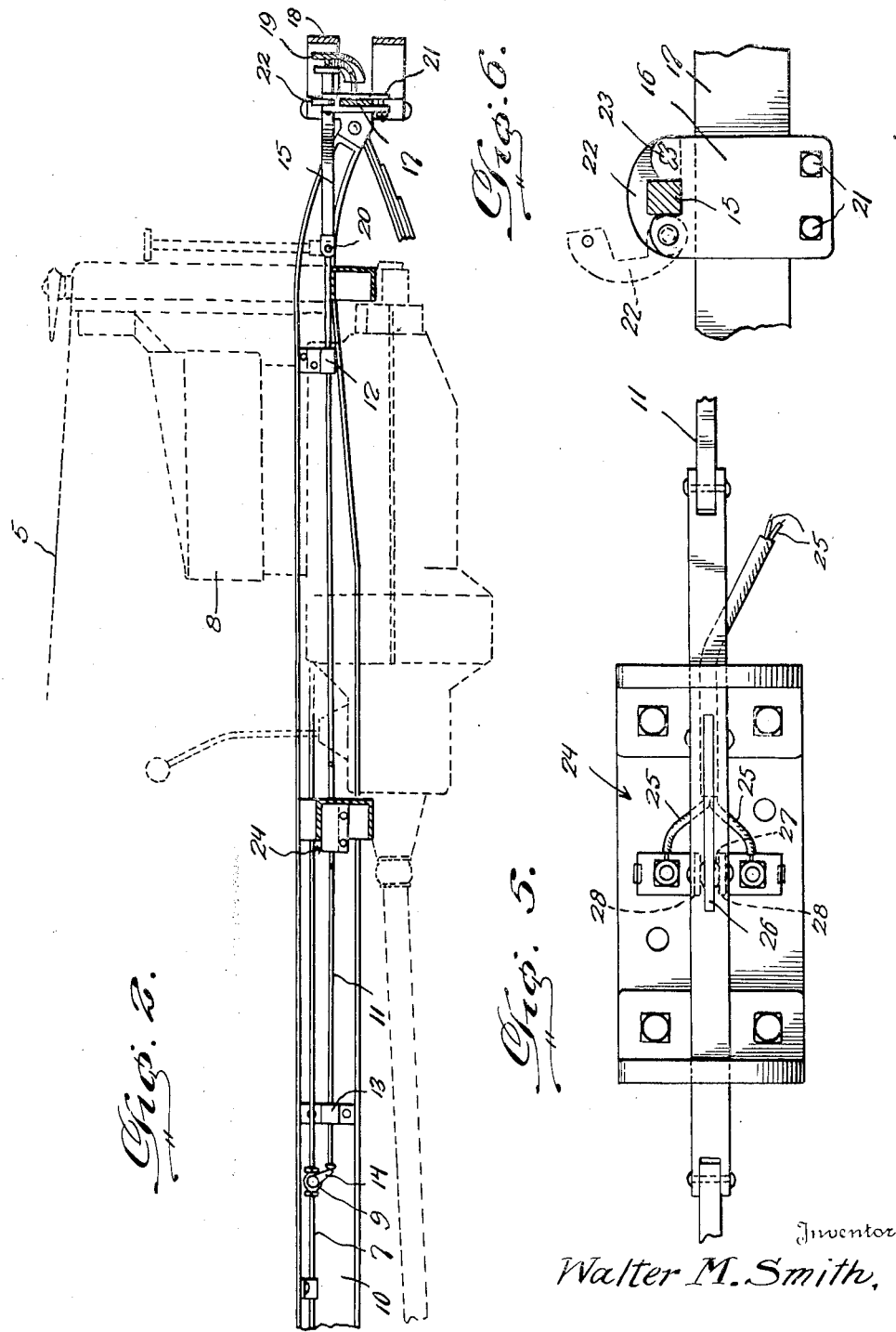

Patented Apr. 2, 1935

1,996,528

UNITED STATES PATENT OFFICE 1,996,528

SAFETY DEVICE FOR AUTOMOBILES

Walter M. Smith, San Diego, Calif.

Application June 25, 1934, Serial No. 732,324

3 Claims. (Cl. 180—83)

This invention relates to a safety device for automobiles, and has more particular reference to bumper-actuated means for rendering the engine of an automobile inoperative so as to reduce to a minimum the serious results caused by colliding of the automobile with some object, as well as to prevent the driver of the automobile leaving the scene of the collision illegally.

A more specific object of the present invention is to provide means associated with the bumper of the automobile to automatically shut off the fuel supply and the ignition system of the automobile engine upon an impact against the automobile bumper.

A still further object of the present invention is to provide a safety device of the above character which is extremely simple and durable in construction, efficient in use, and readily applicable at a minimum expense to existing automobiles.

The present invention consists in the novel form, combination and arrangement of parts hereinafter more fully described, shown in the accompanying drawings, and claimed.

In the drawings:

Figure 1 is a somewhat diagrammatic plan view, partly broken away and in section, showing the chassis of an automobile equipped with a safety device constructed in accordance with the present invention.

Figure 2 is a fragmentary longitudinal section of the construction shown in Figure 1, drawn on an enlarged scale.

Figure 3 is an enlarged detail sectional view showing the switch forming part of the safety device shown in Figure 1 and controlling the ignition system of the automobile engine.

Figure 4 is a transverse section on line 4—4 of Figure 3.

Figure 5 is a top plan view of the switch shown in Figure 3, with part of its casing removed; and Figure 6 is an enlarged fragmentary section on line 6—6 of Figure 1.

Referring in detail to the drawings, the automobile 5 is provided at the rear with the usual gasoline storage tank 6 from which the gasoline is conveyed by a pipe line 7 to the carburetor of the automobile engine 8 located at the front of the automobile as usual. In the gasoline feed line 7 is a suitable shut-off valve 9, arranged in the line 7 intermediate the tank 6 and engine 8 where said line runs along and within one of the channel-shaped side chassis rails 10 of the automobile.

In accordance with the present invention, a rod 11 is arranged longitudinally and diagonally within the automobile frame and mounted for longitudinal movement in suitable guides 12 and 13 attached to the automobile frame, the rear end of rod 11 engaging the handle 14 of the shut-off valve 9 so that rearward movement of rod 11 will operate to close said valve and shut off the supply of fuel from the tank 6 to the carburetor of the engine 8.

Hinged to the forward end of rod 11 is an operating bar 15 which is offset intermediate its ends and slidably mounted in a guide 16 centrally attached to the rear supporting bar 17 of the automobile bumper, which also includes a front yieldable bumper bar 18. The offset in the operating bar 15 positions the forward end of the latter intermediate the sides of the automobile frame, and mounted within the bumper directly in front of the forward end of this bar 15 and directly behind the yieldable front bar 18 of the bumper is a rearwardly movable shoe 19. It will thus be seen that when the yieldable bar 18 of the bumper impacts with an object it is forced rearwardly into engagement with the shoe 19 so as to force the bar 15 rearwardly and thereby cause a corresponding rearward movement of rod 11. The hinged connection between the bar 15 and rod 11 is indicated at 20, and this permits upward swinging movement of the bar 15 so that it may be temporarily positioned out of the way in the event that use of a hand crank is necessary in starting the automobile engine. The guide 16 may consist of a clamp bolted as at 21 on the supporting bar 17 of the bumper and having suitable provision for releasing the actuating bar 15 when it is desired to swing the latter upwardly out of the way. Merely by way of example, the guide 16 is shown as provided with a swinging keeper 22 which may be lifted to release the bar 15 as indicated by dotted lines in Figure 6 and which may be retained in its operative position by a fastening screw 23 or the like.

When the valve 9 is open, the parts are arranged as shown in Figures 1 to 5 inclusive, and it will therefore be clear that when the vehicle is driven against an object the yieldable bumper bar 18 will be forced rearwardly so as to cause corresponding movement of operating bar 15 and rod 11 thereby closing valve 9 and depriving the automobile engine 8 of further supply of fuel. This will prevent the driver from leaving the scene of the collision a material distance unless the parts are reset to including opening of valve 9.

In order to prevent the operator of the vehicle driving away even if the valve 9 is opened, I provide a sliding knife switch 24 in the main circuit 25 of the ignition system of the engine 8, said switch including a blade 26 of insulating material carried by the rod 11 and provided with a conducting member 27 adapted to bridge a pair of spaced contacts 28 carried by the casing of the switch 24 which is suitably attached to the automobile frame. In the normal position of the parts, the bridge piece 27 electrically connects the contacts 28 which are connected in the ignition circuit, but upon rearward movement of rod 11 to cause closing of valve 9, the bridge piece 27 is moved rearwardly from between the contacts 28 so that the ignition circuit is opened or shut off. This causes prompt stopping of the automobile engine when the automobile impacts an object so as to force the yieldable bumper bar 18 rearwardly as mentioned above. As the switch 24 is located within the frame of the automobile beneath its body and at a point between the engine 8 and fuel control valve 9, it is not readily accessible and will thereby serve to prevent immediate leaving of the scene of the collision on the part of an unscrupulous driver.

It will be noted that the shoe 19 extends transversely of the automobile substantially from end to end of the bumper, and is rigid or not resilient and not readily flexible. Also, bolts 30 are rigid with and project rearwardly from the ends of shoe 19 and slidably extend through the rear supporting bar 17 of the bumper to support the shoe 19 for free rearward movement. Thus, when any part of the yieldable bumper bar impacts an object, movement will be transmitted through the shoe 19 to bar 15 for actuation of valve 9 and the switch 24.

From the foregoing description, it is believed that the construction and operation, as well as the advantages of the present invention will be readily understood and appreciated by those skilled in the art. It is noted, however, that the invention is a self-contained attachment for an automobile which may be installed with little modification or alteration of the vehicle or its bumper. Moreover, the attachment is extremely simple so as to embody a minimum number of parts which can be economically produced and which will not readily get out of order. Minor changes in the details of construction illustrated and described are contemplated within the spirit and scope of the invention as claimed.

What I claim as new is:

1. In an automobile, the combination with a bumper having a transverse yieldable bumper bar, of a safety attachment including an operating bar mounted behind said yieldable bumper bar and movable rearwardly by the latter upon impact of said yieldable bumper bar with an object, a longitudinally movable rod connected to and extending rearwardly from said operating bar, and a valve controlling the flow of gasoline from the storage tank to the carburetor of the automobile, said rod being operatively associated with said valve to close the latter when moved rearwardly by the operating bar, said operating bar being arranged intermediate the ends of the bumper and hinged to said rod for upward and rearward swinging movement to an out-of-the-way position.

2. In an automobile, the combination with a bumper having a transverse yieldable bumper bar, of a safety attachment including an operating bar mounted behind said yieldable bumper bar and movable rearwardly by the latter upon impact of said yieldable bumper bar with an object, a longitudinally movable rod connected to and extending rearwardly from said operating bar, a valve controlling the flow of gasoline from the storage tank to the carburetor of the automobile, said rod being operatively associated with said valve to close the latter when moved rearwardly by the operating bar, said operating bar being arranged intermediate the ends of the bumper and hinged to said rod for upward and rearward swinging movement to an out-of-the-way position, said bumper further including a rear supporting bar, and a guide for said operating bar clamped to said rear supporting bar of the bumper and including means to releasably retain said operating bar in operative position and to permit upward and rearward swinging movement of the same to the out of way position.

3. In an automobile, the combination with a bumper having a transverse yieldable bumper bar and a rear transverse supporting bar, a guide mounted on said rear supporting bar of the bumper, an operating bar slidably guided in said guide and movable rearwardly by the yieldable bumper bar upon impact of the latter with an object, a rod connected to and extending rearwardly from said operating bar, and an engine stopping device operable to render the engine of the automobile inoperative upon rearward movement of said rod, said operating bar being hinged to the rod for upward and rearward swinging movement to permit free cranking of the automobile engine by hand, and said guide for the operating bar embodying quickly releasable retaining means for the latter whereby said operating bar is maintained in lowered operative position and may be readily released for being swung upwardly and rearwardly to an out-of-the-way position.

WALTER M. SMITH.